O. C. FRAME.
HANDSAW.
APPLICATION FILED OCT. 18, 1912.
1,076,755.
Patented Oct. 28, 1913.
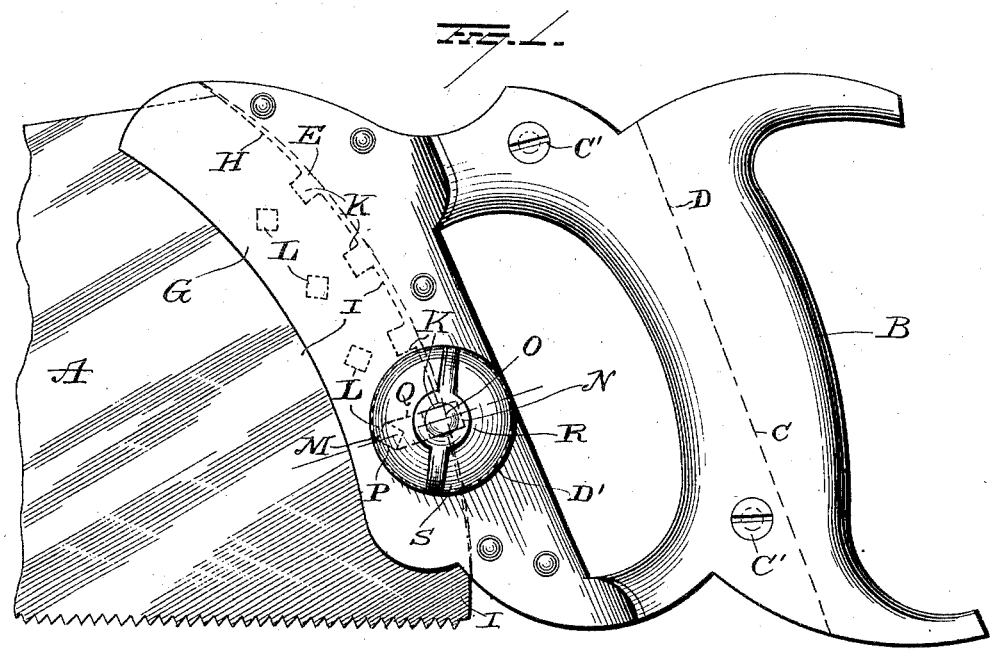
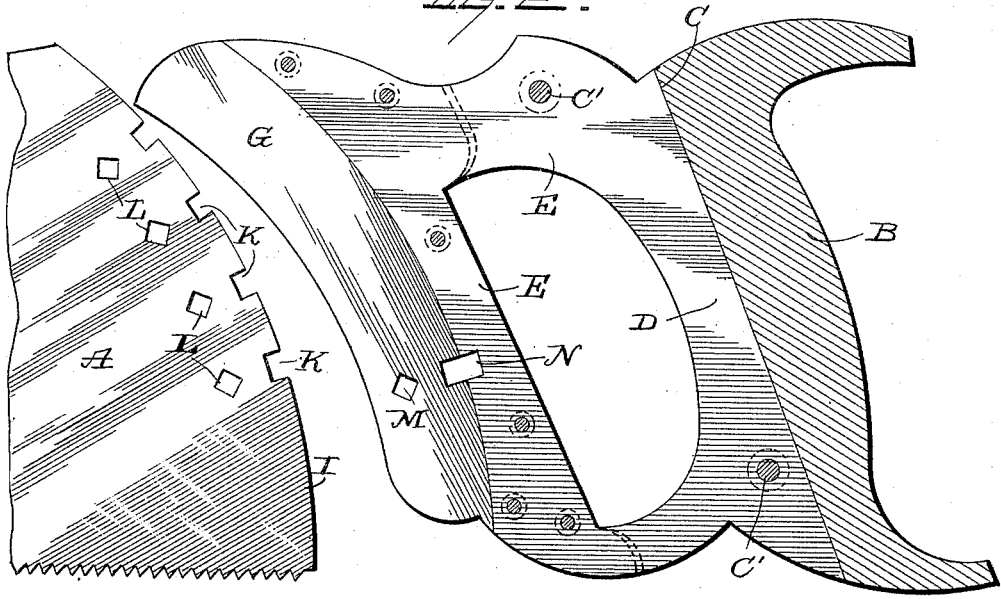
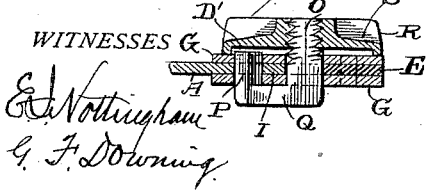
WITNESSES
E. L. Nottingham
G. F. Downing
INVENTOR
O. C. Frame
By H. A. Seymour
Attorney

UNITED STATES PATENT OFFICE.

OLIVER C. FRAME, OF PASADENA, CALIFORNIA.

HANDSAW.

1,076,755.  Specification of Letters Patent.  Patented Oct. 28, 1913.

Application filed October 18, 1912.  Serial No. 726,553.

*To all whom it may concern:*

Be it known that I, OLIVER C. FRAME, a citizen of the United States, residing at Pasadena, in the county of Los Angeles and State of California, have invented certain new and useful Improvements in Handsaws; and I do hereby declare the following to be a full, clear, and exact description of the invention, such as will enable others skilled in the art to which it appertains to make and use the same.

My invention relates to an improvement in hand saws, having for its object the production of a hand saw in which the saw blade may be quickly adjusted and firmly secured at any desired position with relation to the handle.

With this object in view the invention consists in certain features of construction and combinations of parts as will be hereinafter described and pointed out in the claims.

In the accompanying drawings Figure 1 is a view in side elevation of my improvement; Fig. 2 is a similar view illustrating the saw blade as detached from the handle; Fig. 3 is a transverse section of the thumb-nut for clamping the blade to the handle, and Fig. 4 is a view in side elevation of a modification.

A represents the saw blade and B the handle, which is preferably constructed as illustrated in the drawings. Within a saw kerf C formed in the forward portion of the handle is inserted the rear portion D of a reinforcing metal plate E, which is secured in place by the screws $C^1$, or it may be secured by rivets extending through the handle. The forward portion F of the reinforcing plate projects in front of the handle and has firmly riveted to its opposite sides the sheet metal side plates G, which project forwardly from the plate E whereby there is formed between the plates G a narrow slotted seat H for the insertion and firm support of the heel I of the saw blade. The heel I may be formed on the segment of a circle having a slightly greater radius than that of the segment formed by the curved seat H, so that the heel of the blade will bear at or near its ends on the seat in the handle and thus insure the solidity of the bearing for the blade. The rear edge is provided with a series of angular notches K which may be of any desired number, size and shape, and also with a corresponding series of angular holes L, each of which is located in front of and in close proximity to one of the notches K, in the heel of the saw blade.

In metal side plates J are formed two angular holes M and N for the reception of the angular screw threaded shank O and supplemental head P of the two armed locking bolt Q, which is secured in place by means of the thumb nut R, which screws on to the screw threaded end of the shank O. Thumb nut R is provided with a disk S which is concaved on its under side $D^1$ to permit the head P to project therein and beyond the surface of the side plate J, and at the same time to provide an extended bearing of the thumb nut on the side plate J.

When the hand saw is in ordinary use the saw blade is secured in line with the handle as illustrated in Fig. 1, and when thus adjusted and secured, the heel of the blade is firmly retained in place by the two-armed fastening bolt and nut. Instead of employing a wide saw blade, a narrow saw blade may be substituted therefor as illustrated in Fig. 4. The heel of the narrow blade is provided with a single notch and a single hole located in close proximity thereto. Instead of using a blade provided with teeth on one edge only, the blade may be provided with teeth on its opposite edges. The heel of the blade whether broad or narrow, may be provided with a single notch and hole, or with two or more notches or holes, to permit of the angular adjustment of the blade with reference to the handle.

It is frequently desirable to adjust the saw blade at an angle to the handle to permit the saw to be more conveniently used in sawing a floor in the corner of a room, or sawing in some otherwise inaccessible place, and it is desirable to so adjust the handle with reference to the blade to permit the cutting of a dado across a board and retaining the handle out of contact with the board. There are many other instances in which it is desirable to adjust the blade at different angles with reference to the handle, and my improvement permits of the expeditious adjustment of the blade at different angles with respect to the handle and enables the blade to be firmly secured to the handle at any desired angle with relation thereto.

By means of my improved construction the saw blade may be readily adjusted and firmly secured at any desired position with reference to the handle. This is effected by loosening the thumb nut sufficiently to release the supplemental head P of the two armed bolt from the hole in heel of the blade, and then turning the blade to the desired position and reinserting the head P in the hole at that point on the heel and screwing down the thumb nut until its disk is forced snugly against the saw blade. The construction of parts is extremely simple and durable and will enable any user to quickly insert or detach a saw blade or adjust it to any desired angle.

The construction of the handle may be widely varied without departing from the invention. It may be made of cast metal or part metal and part of wood, fiber or other material, and hence I would have it understood that I do not restrict the improvement to the particular construction shown and described.

Having fully described my invention what I claim as new and desire to secure by Letters-Patent, is:—

1. The combination of a saw having notches in the rear edge of its heel portion and also having holes near said notches, a handle having a recessed seat to receive the heel of the saw, said handle having openings to aline with a notch and a hole respectively in the heel of the saw, and a two-armed bolt passing through a notch and hole in the heel of the saw and through said openings in the handle, and securing means applied to one arm of said bolt.

2. The combination with a saw having notches in the rear edge of its heel portion, and having holes near said notches, of a saw having a recessed seat for the heel of the saw, said handle having an opening to aline with any of the notches of the saw heel and also having an opening to aline with any of the holes of the saw heel, a U-shaped bolt passing through the openings of the handle and a notch and hole in the saw heel, one arm of said bolt having a threaded shank, and a thumb nut on said shank and having a concave disk portion bearing against the saw handle.

3. The combination of a handle having a saw seat, having a concave bottom portion, a saw having a heel portion to engage said seat, the rear edge of said heel having a part out of parallel with the concave bottom portion of said seat, and fastening means carried by the handle and adjustably connected with the heel of the saw, to secure the saw to the handle at different adjustments.

4. The combination of a handle having a concave seat for the heel of a saw, a saw having the rear edge of its heel portion convex, the radius of the curve on the heel of the saw being greater than the radius of the curve of said seat, and fastening means carried by the handle and engaging the heel of the saw to secure the saw at different angular adjustments with respect to the handle.

In testimony whereof, I have signed this specification in the presence of two subscribing witnesses.

OLIVER C. FRAME.

Witnesses:
H. E. LUCAS,
HAROLD B. LUCAS.